F. W. A. HENRICI.
REVERSING MECHANISM.
APPLICATION FILED JAN. 13, 1913.

1,227,783.

Patented May 29, 1917.
4 SHEETS—SHEET 1.

Witnesses:
Carl L. Choate
Horace A. Crossman

Inventor:
Fritz W. A. Henrici
Attys.

UNITED STATES PATENT OFFICE.

FRITZ W. A. HENRICI, OF DORCHESTER, MASSACHUSETTS, ASSIGNOR TO LOUIS F. BUFF, OF JAMAICA PLAIN, MASSACHUSETTS.

REVERSING MECHANISM.

1,227,783.    Specification of Letters Patent.    Patented May 29, 1917.

Application filed January 13, 1913. Serial No. 741,752.

*To all whom it may concern:*

Be it known that I, FRITZ W. A. HENRICI, a citizen of the United States, and a resident of Dorchester, county of Suffolk, and State of Massachusetts, have invented an Improvement in Reversing Mechanism, of which the following description, in connection with the accompanying drawings, is a specification, like characters on the drawings representing like parts.

My invention relates to driving mechanism and its object is to provide improved means for automatically reversing, at predetermined times, the direction of rotation of the driven element. This construction has been particularly designed for use in connection with a washing machine, and for rotating the drum thereof first in one direction and then in the other, but it is obvious that the invention is not limited to such use but may be used to advantage in connection with any mechanism where it is desired to automatically reverse the direction of rotation of the driven element at stated periods of time.

In the particular embodiment of my invention selected for illustration and description herein.

My invention is herein shown as embodied in a mechanism comprising a driving shaft provided with a driving pulley for receiving power from any suitable source, and a driven shaft operatively connected to the mechanism or member to be driven. Both driving shaft and driven shaft are each provided with a clutch by means of which they may be operatively connected and the clutch members are so disposed and operatively connected that when the clutch is locked to the driving shaft, the driven shaft will be rotated in one direction, while when the clutch is locked to the driven shaft, said shaft will be rotated in the opposite direction.

Figure 2:
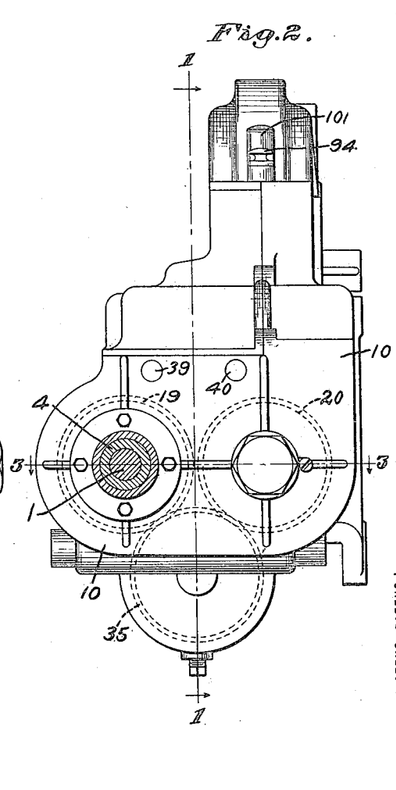
Fig. 2 is an end elevation of the casing containing the driving mechanism, from the right, Fig. 1.
Figure 3:
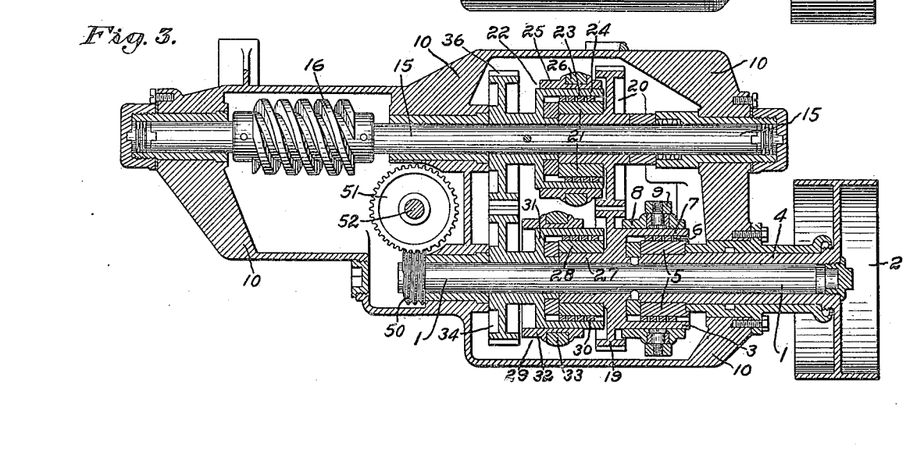
Fig. 3 is a horizontal sectional view substantially on the line 3—3, Fig. 2.
Figure 4:
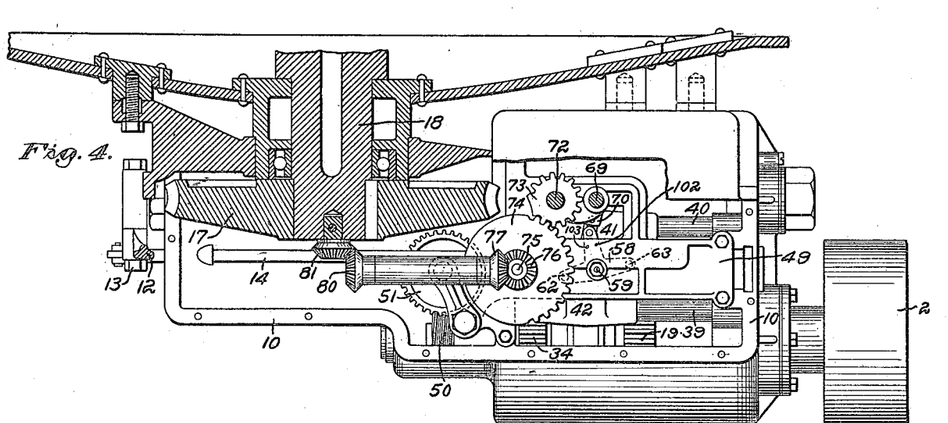
Fig. 4 is a horizontal sectional view substantially on the line 4—4 Fig. 1, the casing and certain parts of the mechanism being partly broken out.

Referring now to the drawings, and first to Figs. 2 and 3, the driving shaft is shown at 1 provided with and adapted to be rotated by a driving pulley 2 which may be clutched to the shaft 1 by means of any suitable starting clutch 3.

The pulley 2 is shown herein as mounted upon a sleeve 4 on shaft 1. The clutch 3, as stated, may be of any suitable and usual construction, but preferably I employ a clutch of the character shown in U. S. Patent No. 840,847, Jan. 8, 1907, to William A. E. Henrici. The clutch is of that type which comprises a friction spring member coiled about a drum and adapted to be tightened thereabout when the clutch is locked in operative engagement. Since this particular clutch *per se* is not claimed herein to be novel, I have not thought it necessary to illustrate the same in detail. I have, however, shown in Fig. 3 such a clutch with sufficient clearness for the purposes of this application. This clutch comprises a sleeve 5, fast upon a second and longer sleeve 4, and about the sleeve 5 is a friction coil spring member 6 carried by and rotatable with a shell 7 which is fast on the shaft 1. Said coil 6 is adapted to be tightened upon and about the sleeve 5 by means of a sliding coil actuator, not shown, which may be operated by moving the actuator ring 8 longitudinally upon the shell 7.

Figure 1:
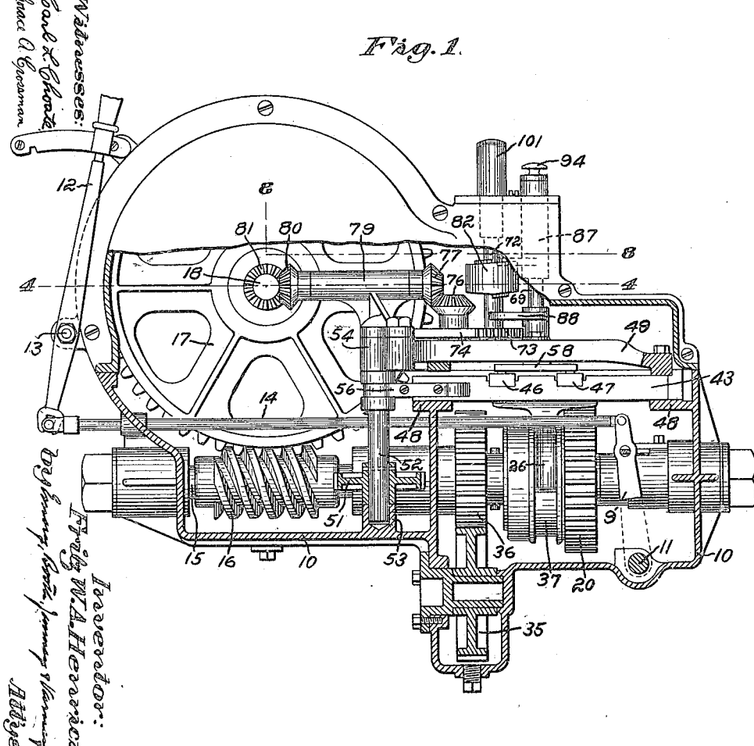
Figure 1 is a vertical sectional view of one form of driving mechanism and my improved reversing mechanism substantially on the line 1—1, Fig. 2, from the left.

This actuator ring 8 is shown as encircling the shell 7, and is given the desired longitudinal movement by means of a yoke 9, Fig. 3, pivoted, see Fig. 1, to the gear casing 10 at 11, said yoke adapted to be operated by a hand lever 12 outside the gear casing and pivoted thereto as at 13, the hand lever being connected to the yoke 9 by any suitable connection as the link 14. Movement of the actuator ring 8 to the left, Figs. 1 and 3, will lock the clutch 3 to the shaft 1, and movement to the right again will unlock the clutch. The complete description of such a clutch may be found in the patent above referred to.

The driven shaft is shown, Fig. 3, at 15, and it may be geared or otherwise connected to the member to be rotated in any suitable manner, according to the character of the mechanism. In the embodiment of the invention herein illustrated, Fig. 1, the driven shaft 15 is provided with a worm 16 which meshes with and drives a worm gear 17 on a shaft 18. Where the mechanism is used in connection with a washing machine, as herein, this shaft 18 may conveniently be that which carries the drum of the washing machine. It is to be understood, however, that the particular character of the mechanism or machine with which this invention is used in no wise modifies the invention, as the latter may be used with any apparatus or machine wherein it is desired to utilize the advantages of the invention.

Both the driving shaft 1 and the driven shaft 15 may be mounted in suitable bearings in the casing 10 and in fact the whole mechanism is preferably inclosed in such casing.

The shell 7, see Fig. 3, has preferably integral therewith, a gear 19 which is fast on the shaft 1, and is in mesh with and drives a gear 20 loose on the shaft 15. The gear 20 has fast thereon a sleeve 21 of another similar clutch 22, and about the sleeve is a friction coil 23 within and carried by a shell 24 fast upon the shaft 15. This clutch 22 is locked to the gear 20 by means of a sliding coil actuator not shown, controlled in turn by an actuator ring 25, to which movement may be imparted by an actuator yoke 26 which will be described later.

Upon the extended hub 27 of the gear 19, and therefore fast upon the shaft 1, is a sleeve 28 of the third clutch 29, similar in construction to the clutch 22. This sleeve 28 is also encircled by a friction coil spring member 30 received within and carried by the shell 31 loose on the shaft 1, and said coil may be tightened about its sleeve 28 by a sliding coil actuator, not shown, which in turn is operated by a coil actuating ring 32, to which movement is imparted by the actuator yoke 33 similar to the yoke 26 previously referred to.

The shell 31 has, preferably integral therewith and loose on shaft 1, a gear 34 in mesh with an idler 35, see Fig. 1, which idler meshes with and drives a gear 36, Fig. 3, fast on the shaft 15 and preferably integral with the shell 24. With this disposition of gears and clutches, it will be seen that, if the starting clutch 3 be locked to shaft 1, when the clutch 29 and gear 34 on said shaft are locked to shaft 1 by tightening the coil 30 about and upon the sleeve 28 on shaft 1, and the clutch 22 is unlocked from the shaft 15, the gear 34 will rotate shaft 15 by means of the idler 35 and gear 36 fast on said shaft, the gear 20 running loose thereon. Under these conditions, the driven shaft 15 will rotate in the same direction as the driving shaft 1.

If, on the other hand, clutch 29 is unlocked from the shaft 1 by loosening the coil 30 from about the sleeve 28 and clutch 22 is locked to gear 20 and the shaft 15 by tightening the coil 23 about and upon the sleeve 21, gear 34 turning loosely on the shaft 1, shaft 15 will be rotated through the engagement of gears 19 and 20, and said shaft will be rotated in a direction opposite to that in which the shaft 1 is rotated.

Figure 5:
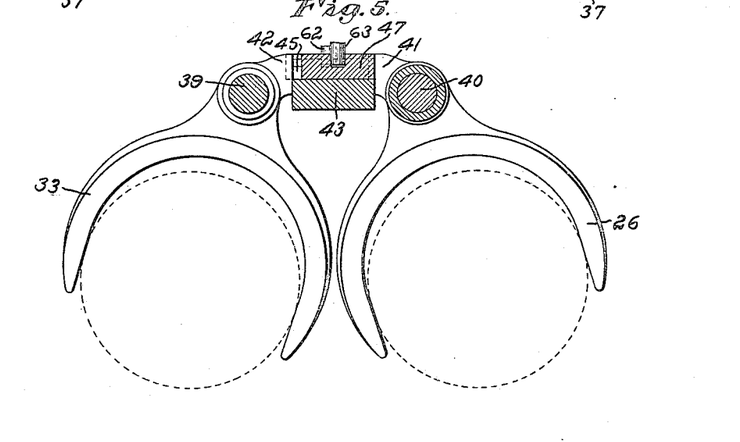
Fig. 5 is a cross sectional view on the line 5—5 Fig. 6, from the right, showing, on an enlarged scale the slide, clutch actuator yokes and the clutch bolts.
Figure 7:
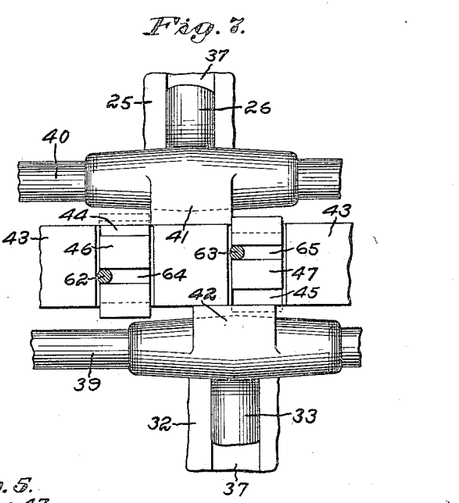
Fig. 7 is a similar view of the same members with the bolts and actuator yokes in the reverse position.

The actuator yokes 26 and 33 that control the movement of the two actuator rings 25 and 32, are clearly shown in Fig. 5, and they are, Fig. 7, received in annular grooves 37 in said rings. These yokes 26 and 33 are, Fig. 5, slidably mounted on rods or supports 39, 40 mounted in the casing 10.

Having briefly described the operation of the clutches for operating the driven shaft, I will now proceed to describe my improved clutch actuating and controlling means by which the clutch actuator yokes 26 and 33 may be automatically operated to reverse, at predetermined periods, the direction of rotation of the driven shaft 15.

Figure 6:
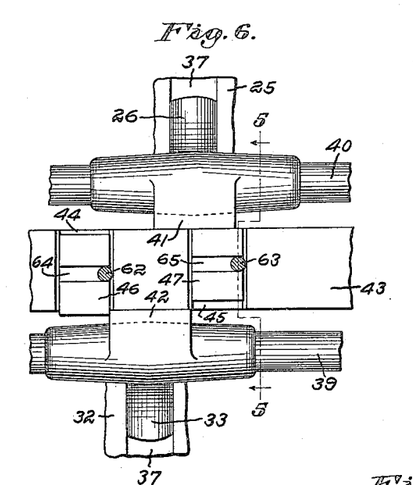
Fig. 6 is a plan view, on an enlarged scale, of the clutch actuator yokes, the slide and the clutch bolts with these members in the positions they occupy when the clutches are in position shown in Fig. 3.

For accomplishing this object I have provided the following means: The yoke 26, Figs. 6 and 7, is provided with a nose or projection 41 and the yoke 33 is provided with a similar nose 42. Positioned between these noses is a slide 43, suitably mounted in the casing and adapted to be reciprocated longitudinally relative to the shaft 1, and provided with transverse grooves 44 and 45, in the first of which is received an unlocking clutch bolt 46, for unlocking said clutches 22—29, and in the other of which is received a locking clutch bolt 47 for locking said clutches. These bolts are of unequal length, the unlocking bolt 46 being somewhat the longer, for the following purpose. To guard against the possibility of both clutches 22—29 being locked at the same time, it is obviously necessary that the unlocking bolt shall always act first. To this end I have, as stated, made the unlocking bolt 46 slightly longer than the locking bolt 47, and the operation of the bolts will be described more in detail later on. As shown in Figs. 3 and 6, the yoke 33 is in the position it occupies when clutch 29 is locked and the yoke 26 is in the position it occupies when clutch 22 is unlocked.

In this position, however, the slide 43 being at its extreme limit of travel to the left, with the bolt 46 in the position shown in Fig. 6, reciprocation of the slide 43 to the right in said figure will carry the bolt 46 against the nose 42 and shift the actuator yoke 33 to the right to unlock the clutch 29 on the shaft 1. If, as the slide 43 approaches the limit of its travel to the right and the bolt 47 is carried beyond the nose 41, Fig. 7, said bolt 47 be projected toward the yoke 26, the bolt will, on the return travel of the slide 43, engage the nose 41 and shift the actuator yoke 26 on the slide 40 to the left thereby locking the clutch 22 to the driven shaft 15.

To unlock the clutch 22, the unlocking bolt 46 is moved in an opposite position to that shown in Fig. 6, that is, toward the yoke 26 into dotted line position Fig. 7, so that, as the slide 43 moves to the right, the bolt 46 will engage the nose 41 of the yoke 26 to shift the same to the right to the position shown in Fig. 6. To lock clutch 29 on the shaft 1 the locking bolt 47 is moved toward the actuator yoke 33, when the slide 43 is at the right hand limit of its movement, into dotted line position Fig. 7, so that, as the slide moves toward the left, the bolt 47 will engage the nose 42 and the yoke 33 will be moved into the position shown in Fig. 6.

As already stated, the slide 43 is supported in the casing 10, and therein upon rests 48, Fig. 1, and is held in operative position by means of a cap plate 49 secured to the frame. Slide 43 is preferably operated directly from the driving shaft 1 and for this purpose said shaft is shown herein, Fig. 3, as provided with a worm 50 which meshes with and drives a worm gear 51 on a vertical shaft 52 supported in bearings 53 and 54, Fig. 1, on the casing 10. Near its upper end said shaft 52 is provided with a crank pin 55, Fig. 9, to which is connected one end of a connecting rod 56, the opposite end of which is pivoted to one end of the slide 43 at 57. For convenience this rod 56 is split vertically lengthwise, the two members being secured by screws 444. It will be obvious that by this means reciprocatory motion will be imparted to the slide 43 direct from the driving shaft 1.

For throwing the bolts 46 and 47, in the described manner, I have provided novel bolt throwing means which is also a part of the clutch controlling and the reversing means. Referring to Figs. 4-8, I provide a suitable rocker member as three arm lever 58, pivoted at 59 to the cap plate 49. The longitudinally opposed arms 60 and 61 of said lever, Fig. 8, engage respectively the bolts 46 and 47 by means of depending studs 62 and 63, Figs. 6 and 9, which are respectively received by transverse slots 64 and 65 in the upper faces of said bolts thus permitting reciprocation of the slide without regard to the positions of the studs 62 and 63. The third arm 66 of the lever 58 is also provided with a depending stud 67, see dotted lines, Fig. 8, which is received between two opposed ends of a spring member 68 coiled about a rotatable shaft or lever throwing member 69 vertically supported in the plate 49, which spring ends tend normally to close upon the stud 67 and approach each other. To properly position said spring ends 68 and control their action upon the lever 58, the shaft 69 is provided, opposite the end of the lever arm 66, Figs. 4 and 8, with a spring positioning arm 70 provided with a vertical stud 71, which is positioned between the two ends of said spring 68 thus providing a flexible, operative connection between the shaft 69 and lever 58.

Obviously, if now the shaft 69 is rotated to cause a similar movement of the arm 70 and pin 71, one or the other of said spring ends 68, according to the direction of rotation of the shaft 69, will engage the pin 67 and rock the lever 58, thereby throwing bolts 46 and 47 in opposite directions in the slide 43 and thereby unlocking one of the clutches 22—29 and locking the other. If, however, when said lever 58 is rocked, either of the noses 41 and 42 on the yokes 26 and 33 is in such position that either of the bolts 46, 47 will engage with either of said noses as in Fig. 6, so that the bolt cannot be thrown to its limit of travel transversely of the slide 43 in response to the movement imparted to the lever 58, then the actuating spring end 68 will yield, the opposite spring end 68 being temporarily carried by the stud 71 permitting the desired rotation of the shaft 69 until such time, during the travel of the slide 43, as the bolt in contact with the yoke nose is carried beyond such nose, when the lever 58 under tension of the spring end 68 will throw the bolt in its groove in the slide 43, beyond said nose. By this means, as stated, a flexible connection is provided between the shaft 69 and lever 58 which will permit of the immediate throwing of the bolts if they are in such position that they can be thrown without interfering with either nose 41 or 42, and if not, will act to throw them upon their coming into position where they may be thrown.

Heretofore it has been common in machines where it was desired to secure alternate forward and backward motion of the rotated member, to actuate and control the reversing mechanism from the driving member. The result has been that, in so far as I am aware, it has been impossible to provide a construction that would insure a substantially equal number of revolutions of the rotated member.

One reason for this difficulty is that, while the driving shaft would be operated at a substantially even speed, and the reversing mechanism actuated at regular intervals thereby, the speed, as well as the actual number of rotations of the driven member, the latter consideration being a most important one, would, nevertheless, vary on account of the slipping of the clutches and the difference in the load carried by the driven member, said member coming more slowly to rest when it carried a heavy load than when it carried a light load. Furthermore, whatever difference existed between the number of rotations in one direction as compared with those in the opposite direction at a given time tended gradually to increase rather than decrease as the operation of the machine continued.

I have discovered that, by controlling the time of operation of the clutch actuating means from the driven or rotated member, instead of from the driving member, the above difficulties are overcome and a substantially equal rotation, or balancing of the driven member in each direction may be obtained.

Therefore to accomplish the above result I have provided a combined clutch controlling, timing and driven member or rotation balancing means for controlling the time of operation of the clutch actuating means and therefore the time of reversal of motion of the driven member, which results in a substantial balancing of the motion of the driven member, and wherever hereafter, I may, for convenience, refer to this combined controlling and rotated member balancing means as "controlling means", it should be understood that said term is always intended to comprehend the balancing effect, to wit, the substantially equal rotation of the driven member in each direction.

In this specific case to impart rotation to the shaft 69 to rock the lever 58 and throw the bolts to reverse the direction of rotation, I have provided means for connecting said shaft direct with the driven member.

Adjacent the shaft 69, Figs. 1, 4, 8 and 9, is an upwardly extended cam shaft 72 mounted to have vertical movement in a bearing in the cap plate 49, provided near its lower end with a gear 73 movably secured thereon as by a feather thus permitting relative longitudinal movement of the gear which is in mesh with a mutilated gear 74 on the lower end of a stud shaft 75, mounted on the plate or member 49, said shaft carrying at its opposite end a beveled gear 76 in mesh with a beveled gear 77 on one end of a laterally extended shaft 78 supported in a bearing 79. Said shaft 78 carries at its opposite end a beveled gear 80 in mesh with a similar gear 81 on the driven member 18, Figs. 1, 4, whereby rotary movement is imparted to the shaft 72.

It is desirable that the shaft 69 and bolt throwing rocker lever 58 be rocked quickly at the proper time in order that the bolts may be shifted quickly. In order to accomplish this result I have provided the mutilated gear 74, of suitable dimensions although any other suitable arrangement of gears may be used. The proportions of this gear and the gears connecting the same with the driven member 18, and their adjustment, are such that the gear 74 makes one revolution for each revolution of the driven member 18 and each revolution of the gear 73 and gives the desired quick action of the bolts 46—47.

Figure 9:
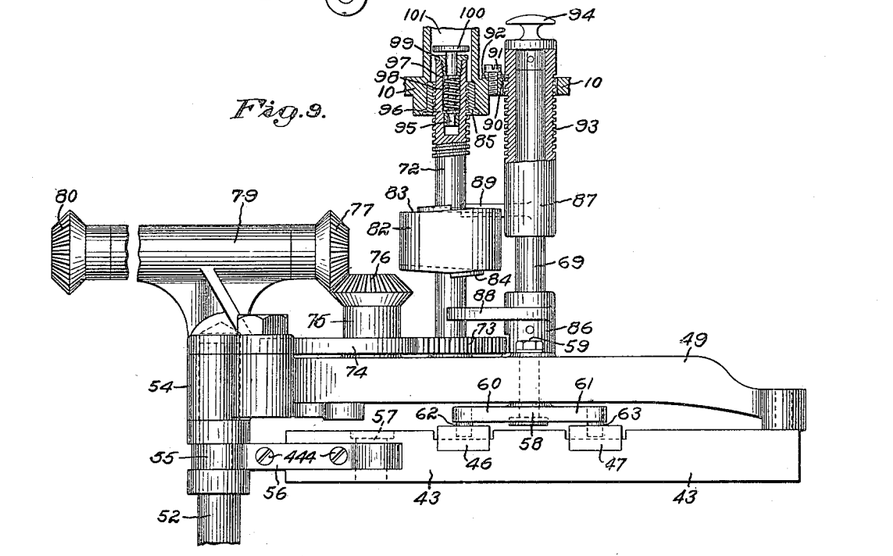
Fig. 9 is a front elevation of the reversing mechanism on an enlarged scale.

I have provided shaft 72, Figs. 1, 9, intermediate its ends with a traveling rocker member actuator, herein shown as a cam 82 having on its upper and lower ends respectively, spiral cam surfaces 83, 84. The upper end of the shaft 72 is screw threaded into a nut 85 fixed in the casing 10, so that as the shaft rotates it will obviously have also a longitudinal movement in said nut and the bearing in plate 49 already referred to either up or down, according to the direction of rotation.

In order that the cam 82 may rock the shaft 69, I have provided the latter with two sleeves 86, 87, Fig. 9, both fixed thereon against relative rotation. The lower sleeve 86 has a rocker member operator thereon as an arm 88 projecting laterally into the path of the cam 82 and is so adjusted on said shaft 69 as to be engaged by the cam surface 84 after downward travel of the cam shaft 72 and the cam 82 for a definite distance. The sleeve 87 is also provided with a rocker member operator as a similar arm 89 projected laterally into the path of the cam 82 and so adjusted on the shaft 69 as to be engaged by the cam surface 83 after upward travel of the shaft 72 and its cam 82 for an equal distance from a central position.

It will be seen that rotation and upward travel of the shaft 72 and cam 82 will cause the cam surface 83 to engage the rocker member operator or arm 89 and rock shaft 69 and, by means of the rocker lever 58, throw the bolts 46, 47 into position to shift the clutches 22, 29 to rotate the driven shaft 15 and drum shaft 18 in one direction, while further opposite rotation and downward travel of the shaft 72 and cam 82 will cause said cam surface 84 to engage the rocker member operator or arm 88 and thus rock the shaft 69 to actuate the rocker lever 58 in the opposite direction to throw the bolts 46, 47 and cause them to shift the clutches 22, 29, to cause opposite rotation of the shaft 15 and drum shaft 18.

Of course, the distance between the arms 88, 89 will determine the length of time that the cam 82 must rotate before it will travel vertically from a central point either up or down, far enough to engage either of said arms, and in this manner the positions of these arms determine the length of time that the mechanism will operate in one direction before the direction of rotation will be reversed. To enable the sleeves 86, 87 to be relatively adjusted on the shaft 69 and thus lengthen or shorten the period between the contacting of the cam 82 with the arms 88, 89, respectively, and consequently the length of time the shaft 72 and the driven shaft 18 will rotate in one direction before they are reversed, I have made the sleeve 87 adjustable longitudinally upon the shaft 69 and have provided means for locking it in desired position thereon, thus constituting it also one member of a timing mechanism. This locking means comprises herein a plate 90 removably secured to the casing 10 or any suitable support by means of a lock screw 91 which extends through a slot 92 in said plate and which is threaded into the casing. This plate 90 may be locked into engagement with any one of several notches 93 in the sleeve 87 thus holding the arm 89 at an adjusted distance from arm 88 to give the desired timing adjustment. The sleeve 87 is provided with a knob 94 at its upper end by means of which it can be conveniently adjusted.

The notches 93 may conveniently be made of such measurement relative to the distance of travel of the cam 82 and rotations of the driven member that an adjustment of the sleeve 87 equal to one notch will cause an increase or decrease of a given number of rotations of the driven member.

From the described construction of the cam shaft it will be evident that if, for any reason, the shaft 69 is prevented from rocking to throw the bolts 46, 47, the cam shaft 72 will continue to rotate and travel in one direction either up or down until it is unscrewed from the nut 85. In that case if the shaft is traveling upwardly it is very likely to become dislocated from its alinement. If it is traveling downwardly it is likely to drop when it is disengaged from the nut 85.

To guard against dislocation of the cam shaft 72 in the manner pointed out above, in case the cam should for any reason fail to reverse the mechanism, as for instance, if a bolt or chip should become so wedged between any of the parts as to prevent throwing of the bolts 46, 47, I have provided a cam shaft safety device which, while permitting continued rotation of the cam shaft under such circumstances, will retain the same in position to again become operative as soon as the trouble is remedied.

In such cases it is most desirable to retain the shaft in alinement if the threads have run out of and above the nut, and to prevent it from dropping if they have traveled below the nut so that the threads may properly engage the nut when the machine has been reversed. To accomplish this result I have drilled the upper end of shaft 72 vertically and inserted therein a spring actuated plunger 95. This plunger is provided with a collar 96, loose thereon and resting on a shoulder in the shaft 72, and also a collar 97 fast thereon between said collars and seated against the same is a coiled spring 98. The plunger is retained in position in the shaft 72 by a thimble 99 threaded into the upper end of the shaft and against which the collar 97 rests. If the reversing means fails to work and the shaft 72 continues to travel upwardly just as the threads of the shaft become disengaged from the nut, the head 100 of the plunger 95 will strike the top of the dome 101, Fig. 1, and thus compress the spring 98 sufficiently to retain the shaft 72 in alinement with the nut and ready to engage the same again, at the same time permitting the shaft to rotate freely. If the shaft travels downwardly and the threads thereon run through the nut 85 the head 100 will rest on the upper end of the nut 85 and, while permitting the shaft to rotate, the head 100 will act to keep it from dropping away from the nut and retain it in contact therewith, ready to engage the same when the mechanism has been reversed.

With the foregoing description the operation of the mechanism will doubtless be clearly comprehended but briefly it is as follows: Let us assume that the clutches 22 and 29 are in the position shown in Fig. 3, the clutch 22 being unlocked from the sleeve 21 and gear 20 and the clutch 29 locked to the sleeve 28, gear 19 and therefore to the shaft 1. It will be observed that the actuator yokes 26 and 33 will be in the positions shown in Fig. 6, and the shaft 15 will rotate in the same direction as the shaft 1 through the gears 34, 35, 36. The cam 82 has, however, just engaged the arm 89 and rocked the same to throw the lever into the position shown in Fig. 8 and the bolts into the position shown in Fig. 6. On the next movement of the slide 43 to the right, the bolt 46 will engage the nose 42 of clutch actuator 37 and carry it to the right as in Fig. 7, thus unlocking clutch 29. On the return movement of the slide 43 to the left the bolt 47 will engage the nose 41 of clutch actuator 26 and throw it to the left as in Fig. 7, thus locking clutch 22 and causing gear 19 to rotate gear 20 and shaft 15 in the opposite direction to the rotation of shaft 1 by means of shell 24 fast on said shaft 15.

The slide 43 will continue to travel back and forth with the bolts 46 and 47 in the position shown in Fig. 7 and the shafts 1 and 15 will rotate in opposite directions until the cam 82 on its downward travel engages arm 88, throwing it and the lever 58 in the opposite direction thus throwing the bolts 46 and 47 into the opposite dotted positions and causing the bolt 46 to throw the yoke 26 to the right and the bolt 47 to to throw the yoke 33 to the left again unlocking clutch 22 from the shaft 15 and locking clutch 29 to the shaft 1 and again reversing the direction of rotation of shaft 15.

Figure 8:
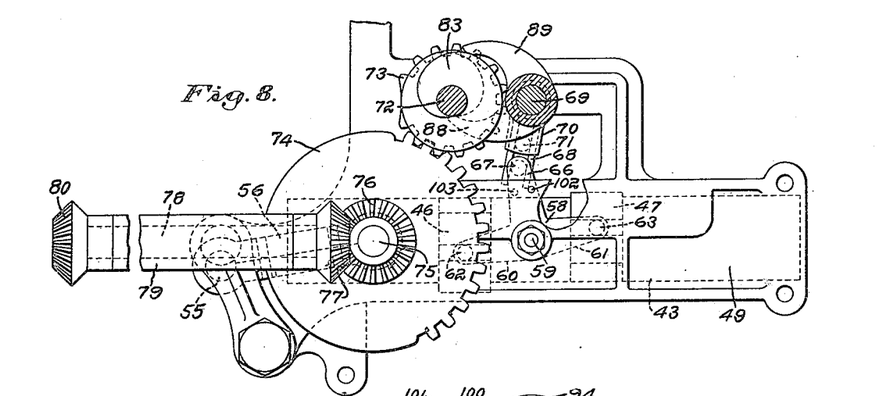
Fig. 8 is an enlarged detail, partly sectional view of the reversing mechanism on the line 8—8 Fig. 1.

If it is desired to operate the mechanism in one direction continuously this may be done by inserting a pin in the aperture 102 in the plate 49 and into one of two radially positioned registering apertures 103 in the arm 66 of the rocker lever 58 according to whether the rocker lever is in the position shown in Fig. 8 or the opposite position. It will be evident that the rocker lever 58 being prevented from rocking by the pin, the spring ends 68 will be alternately compressed and released by the rocking of shaft 69 and the slide 43 will continue to reciprocate with bolts 46—47 in the same position and as they strike the noses 41—42 of the clutch actuators on each reciprocation they will act to retain the clutches in firm locking engagement with their shafts. In machines of this kind, *i. e.*, washing machines, it is necessary that the direction of rotation be reversed periodically to prevent the articles being washed from becoming entangled, twisted into knots and ruined. It is also necessary for best results that the number of rotations of the drum containing the articles to be washed be substantially the same in each direction, because I have learned by experience that in cases where the drum regularly rotates materially longer in one direction than it does in the opposite direction there is a constant tendency for the goods to become entangled and twisted which, in the case of a long run, will cause more or less damage and prevent thorough washing. It is, therefore, very important to provide a mechanism that will give uniformity so far as possible in rotation of the drum in each direction.

The above described construction of reversing mechanism, in addition to its superiority due to its simplicity of design and consequent economy of manufacture, possesses the great advantage over the common construction that it gives almost absolute uniform rotation in each direction.

This result I attribute to the fact that the reversing mechanism is operated directly from the driven member, herein the drum shaft, and not from the driving member.

Where the reversing mechanism is operated from the driving mechanism the action is positive and of substantial regularity without regard to the number of revolutions that the drum has made. The number of revolutions of the drum may be affected by several causes such as the slipping of the clutch. For instance, one clutch may slip, thus retarding the rotation of the drum appreciably in one direction, while the opposite clutch, which rotates the drum in the opposite direction may act positively and thus accelerate the rotation in that direction.

This condition existing throughout a considerable period would cause a constantly increasing difference between the number of rotations in one direction compared with those in the opposite direction which would produce bad results by entangling the articles in the drum.

My invention overcomes this difficulty entirely. It will be noticed that the reversing cam must travel a fixed distance before it will act to reverse the mechanism. Inasmuch as the travel of the cam is in fixed relation to the rotation of the drum, it will be evident that the drum will not be reversed in rotation until the cam has traveled the required distance to contact with the reversing arm. While the retardation or acceleration of rotation of the drum from any cause may affect similarly the speed of the cam, it must necessarily travel the specified distance before reversal takes place. If for any reason, for instance, the cam should overrun its distance of travel, it must travel back the same distance to engage the opposite arm to reverse the rotation of the drum and thus will equalize any error automatically. In fact, the longer the mechanism runs the less the variation becomes between the revolutions in opposite directions. Hence the reversal of rotation taking place only after the cam has traveled a fixed distance and the drum has rotated a corresponding number of times, rotation in opposite directions is much more uniform than when reversal of rotation is effected by the driving member at fixed times without regard to the number of rotations of the driven member.

It may be possible to vary the foregoing construction within the scope of my invention and I claim:

1. Reversing mechanism comprising, in combination, a driving shaft, a driven shaft, gears connecting the same, and a clutch on each shaft actuated by the driving shaft to lock and unlock certain of said gears to and from the shafts to reverse the motion of the driven shaft.

2. Reversing mechanism comprising, in combination, a driving shaft, a driven shaft, gears connecting the same, a clutch on each shaft to lock and unlock certain of said gears to and from the shafts, and automatically acting clutch actuating means operated from the driving shaft to actuate said clutches to reverse the motion of the driven shaft.

3. Reversing mechanism comprising, in combination, a driving shaft, a driven shaft, gears connecting the same, and clutches actuated by the driving shaft and controlled, as to time of actuation, by the driven member to lock and unlock certain of said gears to and from the shafts.

4. Reversing mechanism comprising, in combination, a driving shaft, a driven shaft, gears connecting the same, clutches to lock and unlock certain of said gears to and from the shafts, and automatically acting clutch actuating means operated from the driving shaft and controlled, as to time of actuation, by the driven member to lock and unlock certain of said gears to and from the shafts.

5. Reversing mechanism comprising, in combination, a driving shaft, a driven shaft, gears connecting the same, clutches to lock and unlock certain of said gears to and from the shafts, clutch actuating means, and clutch controlling and rotation balancing means for the clutch actuating means to control the action of said clutches.

6. Reversing mechanism comprising, in combination, a driving shaft, a driven shaft, gears connecting the same, clutches to lock and unlock certain of said gears to and from the shafts, automatically acting clutch actuating means operated from the driving shaft, and clutch controlling means actuated from the driven shaft to control the action of said clutch actuating means.

7. Reversing mechanism comprising, in combination, a driving shaft, a driven shaft, gears connecting the same, clutches to lock and unlock certain of said gears to and from said shafts, clutch actuating means, and clutch controlling and rotation balancing means comprising timing mechanism actuated from the driven shaft to control the action of said clutch actuating means.

8. Reversing mechanism comprising, in combination, a driving shaft, a driven shaft, a gear and a clutch member both fast on each shaft, a gear and coöperating clutch member both normally loose on each shaft, an idler in mesh with certain of said gears, the gears on the two shafts being in operative relation, and the clutch members on each shaft being in operative relation, clutch actuating means, and clutch controlling means for controlling the clutch actuating means to reverse the motion of the driven member.

9. Reversing mechanism comprising, in combination, a driving shaft, a driven shaft, a gear and a clutch member fast on each shaft, a gear and a coöperating clutch member both normally loose on each shaft, an idler in mesh with certain of said gears, the gears on the two shafts being in operative relation, and the clutch members on each shaft being in operative relation, clutch actuating means, and clutch controlling means driven from the driven member for controlling the clutch actuating means to reverse the motion of said driven member.

10. Reversing mechanism comprising, in combination, a driving shaft, a driven shaft, a gear and a clutch member fast on each shaft, a gear and a coöperating clutch member both normally loose on each shaft, an idler in mesh with certain of said gears, the gears on the two shafts being in operative relation and the clutch members on each shaft being in operative relation, clutch actuating means having a step-by-step movement to first unlock one clutch and subsequently lock a second clutch, and clutch controlling means operated from the driven member for controlling the clutch actuating means to reverse the motion of the driven member.

11. Reversing mechanism comprising, in combination, a driving shaft, a driven shaft, gears connecting the same, an idler in mesh with certain of said gears, clutches on said shafts, and clutch actuating means comprising a clutch actuator for each clutch, a slide actuated by the driving member and bolts on said slide adapted to be thrown by the driven member to operate the clutches.

12. Reversing mechanism comprising, in combination, a driving shaft, a driven shaft, gears connecting the same, an idler in mesh with certain of said gears, clutches on said shafts and clutch actuating means comprising clutch actuating yokes, a slide actuated by the driving member, clutch operating bolts on said slide and a bolt throwing lever operated from the driven member.

13. Reversing mechanism comprising, in combination, a driving shaft, a driven shaft, gears connecting the same, an idler in mesh with certain of said gears, clutches on said shafts, and clutch actuating means comprising clutch actuating yokes, a slide actuated by the driven member, clutch operating bolts on said slide and a bolt throwing lever operated from the driven member actuating the bolts transversely of the slides but permitting free longitudinal movement of the slide and bolts.

14. Reversing mechanism comprising, in combination, a driving shaft, a driven shaft, gears connecting the shafts, clutches for locking and unlocking certain of said gears to and from the shafts, clutch actuating means comprising yokes and a slide actuated by the driving member, bolts on said slide, and a bolt throwing rocker lever, and a lever throwing member flexibly connected to said lever and operated from the driven member.

15. Reversing mechanism comprising, in combination, a driving shaft, a driven shaft, gears connecting the shafts, clutches for locking and unlocking certain of said gears to and from the shafts, clutch actuating means comprising yokes, a slide actuated by the driving member, bolts on said slide, and a bolt throwing rocker lever; and clutch controlling and rotation balancing means operated from the driven member comprising a lever throwing member flexibly connected to the rocker lever.

16. Reversing mechanism comprising, in combination, a driving shaft, a driven shaft, gears connecting the shafts, clutches for locking and unlocking certain of said gears to and from the shafts, clutch actuating means, and clutch controlling means to control the action of said clutch actuating means and balance the rotation of the driven member, comprising a plurality of rocker member operators in operative engagement with said clutch actuating means and operated from the driven member.

17. Reversing mechanism, comprising in combination, a driving shaft, a driven shaft, gears connecting the shafts, clutches for locking and unlocking certain of said gears to and from the shafts, clutch actuating means; and clutch controlling means to control the action of said clutch actuating means and balance the rotation of the driven member, comprising a plurality of rocker member operators in operative engagement with said clutch actuating means, and a rocker actuator.

18. Reversing mechanism comprising, in combination, a driving shaft, a driven shaft, gears connecting the shafts, clutches for locking and unlocking certain of said gears to and from the shafts, clutch actuating means, and clutch controlling means to control the action of said clutch actuating means and balance the rotation of the driven member comprising a plurality of rocker member operators in operative engagement with said clutch actuating means; and a rocker actuator adapted to travel between and actuate said rocker member operators and driven from the driven member.

19. Reversing mechanism comprising, in combination, a driving shaft, a driven shaft, gears connecting the shafts, clutches for locking and unlocking certain of said gears to and from the shafts, clutch actuating means, and clutch controlling means to control the action of said clutch actuating means and balance the rotation of the driven member comprising a plurality of rocker member operators in operative engagement with said clutch actuating means; a rocker member actuator, a traveling shaft on which said rocker member actuator is mounted and means to cause the actuator to travel between and rock said rocker member operators, said traveling shaft being driven from the driven member.

20. Reversing mechanism comprising, in combination, a driving shaft, a driven shaft, gears connecting the shafts, clutches for locking and unlocking certain of said gears to and from the shafts, clutch actuating means, clutch controlling and rotation balancing means to control the action of said clutch actuating means and balance the rotation of the driven member comprising a plurality of rocker member operators in operative engagement with said clutch actuating means, a rocker member actuator, a traveling shaft on which said rocker member actuator is mounted and means to cause the actuator to travel between and rock said rocker member operators; and a safety device to hold the traveling shaft in operative position, said shaft being driven from the driven member.

21. Reversing mechanism comprising, in combination, a driving shaft, a driven shaft, gears connecting the shafts, clutches for locking and unlocking certain of said gears to and from the shafts, clutch actuating means, and clutch controlling means to control the action of said clutch actuating means and balance the rotation of the driven member comprising a plurality of rocker member operators in operative engagement with said clutch actuating means, a rocker member actuator, a traveling shaft on which said rocker member actuator is mounted, and means to cause the actuator to travel between and rock said rocker member operators; a safety device to hold the traveling shaft in operative position, said shaft being driven from the driven member, and timing mechanism for determining the time of the actuation of said rocker member operators by said rocker member actuator.

22. Reversing mechanism comprising, in combination, a driving shaft, a driven shaft, gears connecting the shafts, clutches for locking and unlocking certain of said gears to and from the shafts, clutch actuating means, and clutch controlling means to control the action of said clutch actuating means and balance the rotation of the driven member comprising a plurality of sleeves, a rocker member operator carried by each sleeve and connected with said clutch actuating means, a cam adapted to travel between and to engage said rocker member operators; and a traveling shaft for said cam actuated by the driven member.

23. Reversing mechanism comprising, in combination, a driving shaft, a driven shaft, gears connecting the shafts, clutches for locking and unlocking certain of said gears to and from the shafts, clutch actuating means, and clutch controlling means to control the action of said clutch actuating means and balance the rotation of the driven member comprising a plurality of sleeves, a rocker member operator carried by each sleeve and connected with said clutch actuating means, a cam adapted to travel between and to engage said rocker member operators, a threaded shaft for said cam, a support having threaded engagement with said shaft and through which said shaft is adapted to travel, and a gear on said shaft driven by the driven member.

24. Reversing mechanism comprising, in combination, a driving shaft, a driven shaft, gears connecting the shafts, clutches for locking and unlocking certain of said gears to and from the shafts, clutch actuating means, and clutch controlling means to control the action of said clutch actuating means and balance the rotation of the driven member comprising a plurality of sleeves, a rocker member operator carried by each sleeve, and connected with said clutch actuating means, a cam adapted to travel between and to engage said rocker member operators, a traveling shaft for said cam, a support having threaded engagement with the shaft and through which said shaft is adapted to travel, a gear on said shaft driven by the driven member, and a safety device to hold the traveling shaft in operative position comprising a thimble in the end of said shaft, a plunger extending through said thimble into the shaft, the plunger being yieldingly positioned therein, and a stop adapted to engage the head of said plunger.

25. Reversing mechanism comprising, in combination, a driving shaft, a driven shaft, gears connecting the shafts, clutches for locking and unlocking certain of the gears to and from the shafts, clutch actuating means, and clutch controlling means to control the action of said clutch actuating means and balance the rotation of the driven member comprising a plurality of sleeves, a rocker member operator carried by each sleeve and connected with said actuating means, a cam adapted to travel between and to engage the rocker member operators, a shaft for said cam, a gear on said shaft and adapted to be driven from the driven member, and mechanism for regulating the time of actuation of said rocker member operators.

26. Reversing mechanism comprising, in combination, a driving shaft, a driven shaft, gears connecting the shafts, clutches for locking and unlocking certain of the gears to and from the shafts, clutch actuating means, and clutch controlling means to control the action of said clutch actuating means and balance the rotation of the driven member comprising a plurality of sleeves, a rocker member operator carried by each sleeve and connected with said actuating means, a cam adapted to travel between and to engage said rocker member operators, a shaft for said cam, a gear on the shaft and adapted to be driven from the driven member, and timing mechanism for determining the time of actuation of the rocker member operators by said cam and comprising teeth on one of said sleeves and means for locking said sleeve in selected position relatively to said second rocker member.

27. Reversing mechanism comprising, in combination, a driving member, a driven member, means including clutches to lock the driving member to the driven member, clutch actuating means, and clutch controlling and rotation balancing means operated from the driven member to control the time of actuation of the clutches.

28. Reversing mechanism comprising, in combination, a driving member, a driven member, means including clutches to lock the driving member to the driven member, clutch actuating means operated from the driving member, and clutch controlling means operated from the driven member for controlling the time of actuation of the clutches.

29. Reversing mechanism comprising, in combination, a driving member, a driven member, means including clutches to lock the driving member to the driven member, clutch actuating means, and clutch controlling, timing and rotation balancing means actuated from the driven member adapted for adjustably controlling the time of actuation of the clutches.

30. Reversing mechanism comprising, in combination, a driving member, a driven member, means including clutches to lock the driving member to the driven member, clutch actuating means, clutch controlling, timing and rotation balancing means actuated from the driven member adapted for adjustably controlling the time of actuation of the clutches; and a safety device for the clutch controlling means.

31. Reversing mechanism comprising, in combination, a driving member, a driven member, means including clutches to lock the driving member to the driven member, clutch actuating means having a step-by-step movement to first unlock one clutch and subsequently lock a second clutch; and clutch controlling means driven from the driven member to control the time of actuation of the clutches.

32. Reversing mechanism comprising, in combination, a driving member, a driven member, means including clutches to lock the driving member to the driven member, and clutch actuating means comprising a slide actuated by the driving member; and clutch operating bolts thereon adapted to be thrown by the driven member.

33. Reversing mechanism comprising, in combination, a driving member, a driven member, means including clutches to lock the driving member to the driven member, clutch actuating means comprising a slide, clutch operating bolts on the slide and a bolt throwing lever actuated by the driven member.

34. Reversing mechanism comprising, in combination, a driving member, a driven member, means including clutches to lock the driving member to the driven member, and clutch actuating means comprising a slide, clutch operating bolts on the slide and a bolt throwing lever actuated by the driven member actuating the bolts transversely of the slide but permitting free longitudinal movement of the slide and bolts.

35. Reversing mechanism comprising, in combination, a driving member, a driven member, means including clutches to lock the driving member to the driven member, and clutch actuating means comprising a slide, clutch operating bolts on the slide, a bolt throwing lever, and a lever throwing member flexibly connected thereto and operated from the driven member.

36. Reversing mechanism comprising, in combination, a driving member, a driven member, means including clutches to lock the driving member to the driven member, clutch actuating means comprising a slide actuated by the driving member, clutch operating bolts on the slide, a bolt throwing lever and a lever throwing member flexibly connected thereto; and clutch controlling and rotation balancing means actuated from the driven member.

37. Reversing mechanism comprising, in combination, a driving member, a driven member, means including clutches to lock the driving member to the driven member, clutch actuating means; and clutch controlling means to control the time of actuation of the clutches comprising a plurality of rocker member operators operatively connected with said clutch actuating means and operated from the driven member.

38. Reversing mechanism comprising, in combination, a driving member, a driven member, means including clutches to lock the driving member to the driven member, clutch actuating means, and clutch controlling means to control the time of actuation of the clutches and balance the rotation of the driven member comprising a plurality of rocker member operators operatively connected with the clutch actuating means and a rocker member actuator.

39. Reversing mechanism comprising, in combination, a driving member, a driven member, means including clutches to lock the driving member to the driven member, clutch actuating means; and clutch controlling means to control the time of actuation of the clutches comprising a plurality of rocker member operators operatively connected with the clutch actuating means, and a rocker member actuator adapted to travel between and actuate said rocker member operators.

40. Reversing mechanism comprising, in combination, a driving member, a driven member, means including clutches to lock the driving member to the driven member, clutch actuating means; clutch controlling means to control the time of actuation of the clutches comprising a plurality of rocker operators operatively connected to the clutch actuating means, a rocker member actuator, a traveling shaft on which said actuator is mounted, said actuator being adapted to travel between and actuate the rocker member operators; and a safety device to hold the traveling shaft in operative relation to the rocker member operators, said shaft being driven from the driven member.

41. Reversing mechanism comprising, in combination, a driving member, a driven member, means including clutches to lock the driving member to the driven member, clutch actuating means; clutch controlling means to control effective action of the clutch actuating means comprising a plurality of rocker operators operatively connected to the clutch actuating means, a rocker member actuator, a traveling shaft carrying said rocker member actuator between and to actuate the rocker member operators; a safety device to hold the shaft in operative relation to the rocker member operators, said shaft being driven from the driven member; and means for adjustably determining the time of actuation of the rocker member operators by said actuator.

42. Reversing mechanism comprising, in combination, a driving member, a driven member, means including clutches to lock the driving member to the driven member, clutch actuating means; and clutch controlling means to control the time of actuation of the clutches comprising a plurality of sleeves, a rocker member operator on each sleeve operatively connected with the clutch actuating means, a cam adapted to travel between and to engage said rocker member operators; and a traveling shaft for said cam.

43. Reversing mechanism comprising, in combination, a driving member, a driven member, means including clutches to lock the driving member to the driven member, clutch actuating means; and clutch controlling means to control the effective action of the clutch actuating means and control the time of actuation of the clutches comprising a plurality of sleeves, a rocker member operator on each sleeve and operatively connected with the clutch actuating means, a cam adapted to travel between and to engage said rocker member operators, a threaded shaft for the cam and a support having threaded engagement with the shaft and through which support the shaft travels.

44. Reversing mechanism comprising, in combination, a driving member, a driven member, means including clutches to lock the driving member to the driven member, clutch actuating means; clutch controlling means to control the effective action of the clutch actuating means and the time of actuation of the clutches comprising a plurality of sleeves, a rocker member operator on each sleeve and operatively connected with the clutch actuating means, a cam adapted to travel between and to engage the rocker member operators, a support for threaded engagement with the shaft and through which it is adapted to travel, a gear on the shaft driven by the driven member; and a safety device to retain the shaft in operative relation with the rocker member operators comprising a thimble on the shaft, a plunger extended through the thimble and into the shaft, the plunger being yieldingly positioned in the thimble; and a stop member adapted to be engaged by the head of the plunger.

45. Reversing mechanism comprising, in combination, a driving member, a driven member, means including clutches to lock the driving member to the driven member, clutch actuating means; and clutch controlling means to control the time of actuation of the clutches comprising a plurality of sleeves, a rocker member operator on each sleeve and operatively connected with the clutch actuating means, a cam adapted to travel between and to engage the rocker member operators, a shaft for the cam, a gear on said shaft driven from the driven member; and means for adjustably determining the time of the actuation of the clutches.

46. Reversing mechanism comprising, in combination, a driving member, a driven member, means including clutches to lock the driving member to the driven member, clutch actuating means; clutch controlling means for controlling the time of actuation of the clutches comprising a plurality of sleeves, a support therefor, a rocker member operator on each sleeve operatively connected with the clutch actuating means, a cam adapted to travel between and engage the rocker member operators, a shaft on the cam, a gear on said shaft driven from the driven member; and means for adjustably determining the time of actuation of the rocker member operators and clutches comprising means for locking the sleeves in adjusted positions relative to each other.

47. Reversing mechanism comprising, in combination, a driving shaft, a driven shaft, means including clutches for locking the driving shaft to the driven shaft, and clutch actuating means comprising a slide actuated by the driving member, clutch actuating bolts on the slide and a bolt throwing member operated by the driven member.

48. Reversing mechanism comprising, in combination, a driving member, a driven member, means including clutches for locking the driving member to the driven member; clutch actuating means comprising a slide actuated by the driving member, bolts on the slide, a bolt throwing lever, and a rocker lever throwing member flexibly connected with the lever; and clutch controlling means to control the time of actuation of the clutches.

49. Reversing mechanism comprising, in combination, a driving member, a driven member, means including clutches for locking the driving member to the driven member; clutch actuating means comprising a slide actuated by the driving member, bolts thereon, and a bolt throwing rocker lever; and clutch controlling and rotation balancing means comprising a rocker lever throwing member, rocker member operators thereon, a rocker member actuator adapted to travel between and to engage the rocker member operators; and means to operate the rocker member actuator from the driven member.

50. Reversing mechanism comprising, in combination, a driving member, a driven member, means including clutches for locking the driving member to the driven member, clutch actuating means comprising a slide actuated by the driving member, bolts thereon, and a bolt throwing rocker lever; and clutch controlling means comprising a rocker lever throwing member provided with rocker arms, a rocker arm actuator, a traveling shaft for said actuator, a bearing for the shaft, the rocker arm actuator being adapted to travel between and to engage the rocker arms; and means for operating the traveling shaft from the driven member.

51. Reversing mechanism comprising, in combination, a driving member, a driven member, means including clutches for locking the driving member to the driven member, clutch actuating means comprising a slide actuated from the driving member, bolts thereon, and a bolt throwing rocker lever; clutch controlling means comprising a rocker lever throwing member, relatively adjustable rocker arms thereon, a rocker arm actuator, a threaded shaft carrying said actuator, a threaded bearing for the shaft, the shaft adapted to have longitudinal movement through the bearing and to cause the actuator to travel between and engage the rocker arms; a safety device to retain the traveling shaft in operative relation to the rocker arms; and means to operate the rocker actuator from the driven member.

52. In reversing mechanism clutch controlling means comprising in combination, a rocker lever throwing member, rocker member operators on said throwing member, a rocker arm actuator adapted to travel between and to engage said rocker member operators; and means to actuate the rocker actuator.

53. In reversing mechanism clutch controlling means comprising in combination, a rocker lever throwing member, rocker member operators for said throwing member, means for adjustably locking the operators in relative adjusted position, a rocker member actuator adapted to travel between and to engage the rocker operators, a shaft for the actuator, and a bearing for said shaft having a threaded engagement therewith.

54. In reversing mechanism a shaft, a bearing therefor, the shaft being axially slidable with respect to the bearing, a cam on the shaft and adapted to travel therewith, and a safety device for the shaft and cam to retain the shaft in operative relation to its bearing.

55. In reversing mechanism the combination of a driven member, a clutch therefor, means for actuating the clutch, and clutch controlling means including a rocker member traveling actuator for determining the time and extent of the travel of the driven member.

56. Reversing mechanism comprising in combination, a driving shaft 1, driven shaft 15, gears 19, 20, 34, 36 connecting the shafts, clutches 3, 22, 29 for locking and unlocking certain of the gears to and from the shafts; and clutch actuating means comprising yokes 26, 33, slide 43, actuated by the driving member, bolts 46, 47 in said slide, and a bolt throwing rocker lever 58; and clutch controlling and rotation balancing means operated from the driven member comprising the lever throwing member 69 flexibly connected with the rocker lever 58.

57. Reversing mechanism comprising in combination, a driving shaft, a driven shaft, gears connecting the shafts, clutches for locking and unlocking certain of the gears to and from the shafts, and clutch actuating means; and clutch controlling means to control the action of said clutch actuating means and balance the rotation of the driven member comprising the rocker member operators 88, 89, the rocker member actuator 82, traveling shaft 72, and means to cause said actuator to travel between and rock said rocker member operators.

58. Reversing mechanism comprising, in combination, a driving shaft, a driven shaft, gears connecting the shafts, clutches for locking and unlocking certain of said gears to and from the shafts, and clutch actuating means; and clutch controlling means comprising the sleeves 86, 87, the rocker member operators 88, 89, carried by said sleeves, cam 82, traveling shaft 72, support 10 threaded to said shaft, and through which the shaft is adapted to travel, and gear 73 on the shaft driven by the driven member.

59. Reversing mechanism comprising, in combination, a driving shaft, a driven shaft, gears connecting the shafts, clutches for locking and unlocking certain of the gears to and from the shafts, and clutch actuating means; and clutch controlling means to control the action of the clutch actuating means and balance the rotation of the driven member comprising a plurality of sleeves 86, 87, a rocker member operator carried by each sleeve and connected with the actuator means, a cam adapted to travel between and to engage the rocker member operators, a shaft for said cam, and a gear on the shaft adapted to be driven from the driven member; and timing mechanism for determining the time of actuation of the rocker member operators by said cam and comprising teeth 93 on the sleeve 87, lock screw 91, and a support 10, for locking said sleeve in adjusted position relatively to the second rocker member operator.

In testimony whereof, I have signed my name to this specification, in the presence of two subscribing witnesses.

FRITZ W. A. HENRICI.

Witnesses:
ROBERT H. KAMMLER,
BERTHE DAVID.

Copies of this patent may be obtained for five cents each, by addressing the "Commissioner of Patents, Washington, D. C."